United States Patent
Chen et al.

(10) Patent No.: US 9,414,080 B2
(45) Date of Patent: Aug. 9, 2016

(54) METHOD AND SYSTEM FOR ASYMMETRICAL RATE CONTROL FOR 3D VIDEO COMPRESSION

(75) Inventors: Xuemin Chen, Rancho Santa Fe, CA (US); Samir Hulyalkar, Newtown, PA (US); Marcus Kellerman, San Diego, CA (US); Ilya Klebanov, Thornhill (CA)

(73) Assignee: BROADCOM CORPORATION, Irvine, CA (US)

( * ) Notice: Subject to any disclaimer, the term of this patent is extended or adjusted under 35 U.S.C. 154(b) by 1867 days.

(21) Appl. No.: 12/545,679

(22) Filed: Aug. 21, 2009

(65) Prior Publication Data

US 2011/0043608 A1 Feb. 24, 2011

(51) Int. Cl.
| | |
|---|---|
| *H04N 7/12* | (2006.01) |
| *H04N 19/187* | (2014.01) |
| *H04N 19/597* | (2014.01) |
| *H04N 19/159* | (2014.01) |
| *H04N 19/172* | (2014.01) |
| *H04N 19/30* | (2014.01) |
| *H04N 19/115* | (2014.01) |
| *H04N 19/61* | (2014.01) |

(52) U.S. Cl.
CPC ............ *H04N 19/187* (2014.11); *H04N 19/115* (2014.11); *H04N 19/159* (2014.11); *H04N 19/172* (2014.11); *H04N 19/30* (2014.11); *H04N 19/597* (2014.11); *H04N 19/61* (2014.11)

(58) Field of Classification Search
CPC ............ H04N 19/597; H04N 13/0048; H04N 13/0059; H04N 13/0055; H04N 13/0438; H04N 19/172; H04N 13/0018; H04N 13/0275; H04N 13/04; H04N 19/10; H04N 19/127; H04N 19/132; H04N 19/152; H04N 19/156; H04N 7/12
USPC .............................................. 375/240.01–29
IPC .......................................................... H04N 7/12
See application file for complete search history.

(56) References Cited

U.S. PATENT DOCUMENTS

| | | | | | |
|---|---|---|---|---|---|
| 6,072,831 | A | * | 6/2000 | Chen ................... | H04N 19/177 348/43 |
| 6,343,098 | B1 | * | 1/2002 | Boyce ................. | H04N 19/176 375/240.03 |
| 2008/0198920 | A1 | * | 8/2008 | Yang et al. ............... | 375/240.01 |
| 2010/0165077 | A1 | * | 7/2010 | Yin et al. ........................ | 348/42 |

\* cited by examiner

*Primary Examiner* — Jessica M Prince
(74) *Attorney, Agent, or Firm* — Garlick & Markison; Bruce E. Garlick (57) ABSTRACT

A video transmitter compresses an uncompressed 3D video into a base view video and an enhancement view video using MPEG-4 MVC standard. The video transmitter allocates bits to compressed pictures of the uncompressed 3D video based on corresponding picture type. More bits are allocated to I-pictures than P-pictures, and more bits are allocated to P-pictures than B-pictures in a given coding view. More bits are allocated to a compressed picture of the base view video than a same type compressed picture of the enhancement view video. The correlation level between the base view video and the enhancement view video is utilized for bit-allocation in video compression. More bits are allocated to a picture in a lower coding layer than to the same type picture in a higher coding layer in a given coding view. Pictures with the same cording order are identified from different view videos for a joint bit-allocation.

20 Claims, 8 Drawing Sheets

METHOD AND SYSTEM FOR ASYMMETRICAL RATE CONTROL FOR 3D VIDEO COMPRESSION

CROSS-REFERENCE TO RELATED APPLICATIONS/INCORPORATION BY REFERENCE

NOT APPLICABLE.

FIELD OF THE INVENTION

Certain embodiments of the invention relate to video processing. More specifically, certain embodiments of the invention relate to a method and system for asymmetrical rate control for 3D video compression.

BACKGROUND OF THE INVENTION

Digital video capabilities may be incorporated into a wide range of devices such as, for example, cellular telephones, digital televisions, digital direct broadcast systems, digital video recording or capture devices, and the like. Digital video devices may provide significant improvements over conventional analog video systems in processing and transmitting video sequences with increased bandwidth efficiency.

Video content may be recorded in two-dimensional (2D) format or in three-dimensional (3D) format. In various applications such as, for example, the DVD movies and the digital TV, a 3D video is often desirable because it is often more realistic to viewers than the 2D counterpart. A 3D video comprises a left view video and a right view video. A 3D video frame may be produced by combining left view video components and right view video components, respectively.

Various video encoding standards, for example, MPEG-1, MPEG-2, MPEG-4, H.263, and H.264/AVC, have been established for encoding digital video sequences in a compressed manner. A frame in a compressed video may be coded in three possible modes: I-picture, P-picture, and B-picture. Compressed video frames may be divided into groups of pictures (GOPs). For example, each GOP may comprise one I-picture, several P-pictures and/or several B-pictures.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for asymmetrical rate control for 3D video compression, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

Certain embodiments of the invention may be found in a method and/or system for asymmetrical rate control for 3D video. In various embodiments of the invention, a video transmitter is operable to acquire an uncompressed three-dimensional (3D) video comprising a left view video and a right view video. The video transmitter may be operable to compress the acquired 3D video using MPEG-4 Multi-view Video Coding (MVC) standard to generate two coding views (a base view and an enhancement view). Each coding view comprises a plurality of layered compressed pictures for transmission. In this regard, the video transmitter may be operable to allocate bits to each resulting compressed picture of the acquired uncompressed 3D video based on corresponding picture type such like I-picture, P-picture and B-picture. In a given coding layer, most bits available for each view video may be allocated to I-pictures, and more bits may be allocated to P-pictures than B-pictures in the same view. More bits may be allocated to a compressed picture of the base view video than a same type compressed picture of the enhancement view video. In the acquired uncompressed 3D video, the correlation level between the base view video and the enhancement view video may be utilized for bit-allocation in video compression. For a given coding view, more bits may be allocated to a picture in a lower coding layer than to the same type picture in a higher coding layer. Target bit-rates may be determined and/or established for the associated base and enhancement view videos for video compression. The base view video and the enhancement view video may be processed concurrently based on the corresponding determined target bit-rates. Coding orders may be determined according to the determined target bit-rates. Pictures with the same coding order may be identified for a joint bit-allocation. The identified compressed pictures with same coding order may be in different view videos.

Figure 1:
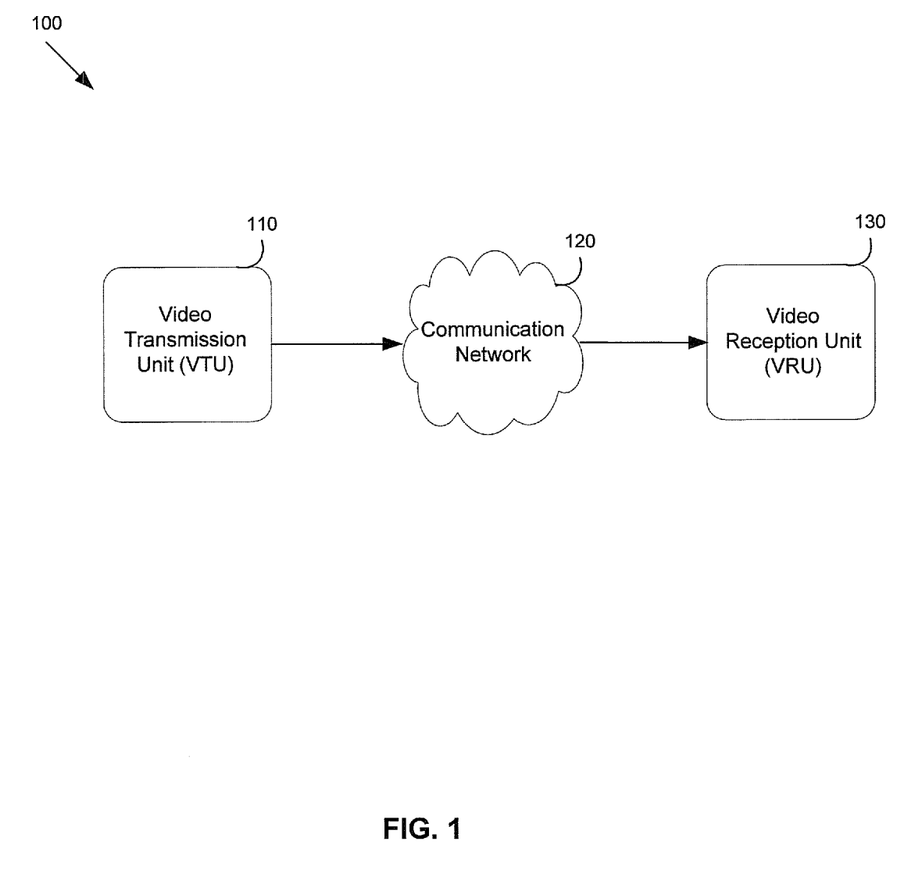
FIG. 1 is a block diagram of an exemplary video coding system that is operable to perform asymmetrical rate control for 3D video compression, in accordance with an embodiment of the invention.

FIG. 1 is a block diagram of an exemplary video coding system that is operable to perform asymmetrical rate control for 3D video compression, in accordance with an embodiment of the invention. Referring to FIG. 1, there is shown a video transmission unit (VTU) 110, a communication network 120 and a video reception unit (VRU) 130.

The VTU 110 may comprise suitable logic, circuitry, interfaces and/or code that may be operable to provide compressed video content to the VRU 130. The VTU 110 may be operable to acquire an uncompressed 3D video and perform video compression on the acquired uncompressed 3D video. MPEG-4 MVC standard may be applied to generate two coding views, namely a base view and an enhancement view, and layered compressed pictures for transmission. The resulting base and enhancement compressed video streams may be multiplexed into a single stream (a transport stream) with a targeted bit rate for transmission. Various video compression algorithms such as, for example, run-length coding and/or Huffman or arithmetic codes, may be utilized to compress the acquired uncompressed 3D video to a compressed picture sequence. The bit rate of each compressed picture may vary. In this regard, the VTU 110 may be operable to allocate variable number of bits to each compressed picture. The VTU 110 may be operable to perform (bit) rate-control in video compression based on picture type. The rate-control may be performed using various methods, for example, a quantization level (QL) control method, to ensure that a targeted bit rate is achieved and maintained in video compression. Pictures in the compressed picture sequence may comprise I-pictures, P-pictures and/or B-pictures. Pictures in the compressed picture sequence may be from the base view video, the enhancement view video and may belong to different coding layers for a layered video compression. In this regard, the rate-control may be managed in video compression not only based on picture type like I-picture, P-picture and B-picture, but also based on associated coding view (base or enhancement) and/or coding layers. For example, more bits may be allocated to a picture in the base view video than to a same type picture in the enhancement view video. In instances where a layered video may be considered, layer 1, layer 2 and layer 3 may correspond to the lowest coding layer (a base layer) to the highest coding layer in video compression. More bits may be allocated to a picture in layer 1 than to a same type picture in layer 2 and/or layer 3.

In a 3D video, the associated base view and enhancement view videos belong to the same program. The correlation level between the base view video and the enhancement view video may be considered for rate control in video compression. For example, the VTU 110 may be operable to adjust or balance bit allocation between the base view video and the enhancement view video according to the corresponding correlation level. A joint rate control may be executed concurrently for both the base view and the enhancement view of the 3D video. In this regard, pictures with the same coding ordering may be a joint entity for bit-allocation. A coding order is the order in which pictures may be compressed or coded by the VRU 130. The bit allocation may be determined and implemented jointly for pictures with the same coding ordering.

The communication network 120 may comprise suitable logic, circuitry, interfaces and/or code that may be operable to provide platforms for communication between the VTU 110 and the VRU 130. The communication network 120 may be implemented as a wired or wireless communication network. The communication network 120 may be local area network, wide area network, the Internet, and the like.

The VRU 130 may comprise suitable logic, circuitry, interfaces and/or code that may be operable to receive a transport stream from the VTU 110 over the communication network 120. The received transport stream may comprise coded or compressed 3D video streams of entertainment programs such as, for example, a 3D TV program. The VRU 130 may be operable to decode the received compressed 3D video streams of the 3D TV program using MPEG-4 Multi-view Video Coding (MVC) standard to generate a left view and a right view. The generated left and right views may be composed to present to users. Examples of the VRUs 130 through 150 may comprise, for example, set-top boxes, personal computers, and the like.

In an exemplary operation, the VTU 110 may be operable to acquire an uncompressed 3D video comprising a left view video and a right view video. The VTU 110 may be operable to use MPEG-4 MVC standard to generate two coding views (a base view and an enhancement view) and layered compressed pictures for transmission. The uncompressed 3D video may be compressed picture-by-picture with a target bit-rate. The target bit-rate may be controlled and maintained via adaptive bit-allocation based on picture type and associated coding view and coding layers. The VTU 110 may be operable to perform an adaptive bit-allocation picture-by-picture such that the resulting compressed pictures may be generated with corresponding target bit-rate. The bit-allocation may be adaptive to picture type like I-picture, P-picture and B-picture, associated coding view (base or enhancement) and/or coding layers. The correlation level between the base view video and the enhancement view video may be considered for rate control in video compression. The generated 3D compressed video may be communicated with the VRU 130 via the communication network 120. The VRU 130 may be operable to decode the 3D compressed video from the VTU 110 using MPEG-4 MVC standard to generate a left view and a right view for display. The generated left and right views may be composed to present to users.

Figure 2:
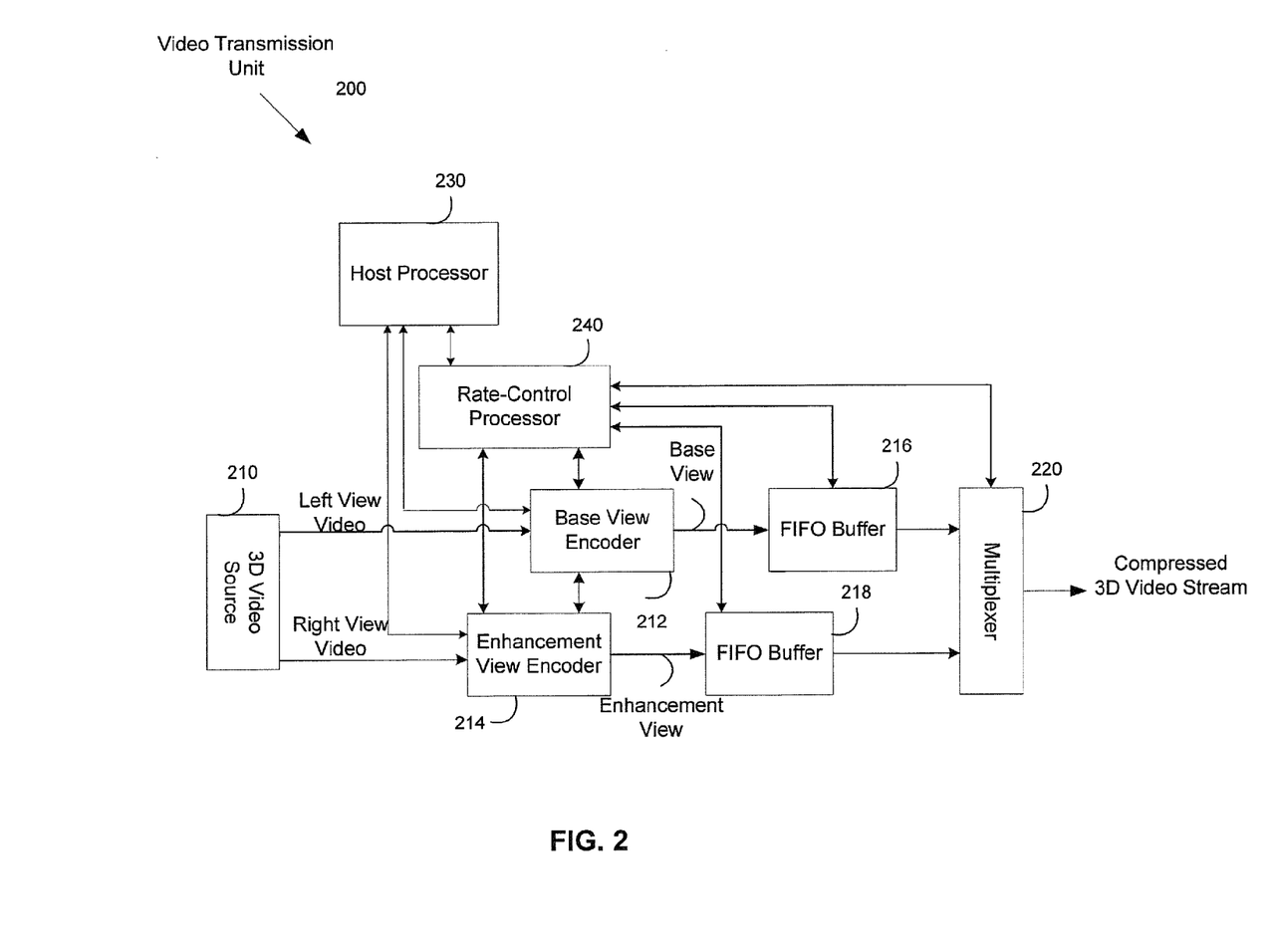
FIG. 2 is a diagram illustrating an exemplary video transmission unit that is operable to implement asymmetrical rate control for 3D video compression, in accordance with an embodiment of the invention.

FIG. 2 is a diagram illustrating an exemplary video transmission unit that is operable to implement asymmetrical rate control for 3D video compression, in accordance with an embodiment of the invention. Referring to FIG. 2, there is shown a video transmission unit (VTU) 200. The VTU comprises a 3D video source 210, a base view encoder 212, an enhancement view encoder 214, FIFO buffers 216-218, a multiplexer 220, a host processor 230 and a rate-control processor 240.

The 3D video source 210 may comprise suitable logic, circuitry, interfaces and/or code that may be operable to capture uncompressed 3D video contents. A 3D video comprises a left view video and a right view video. A 3D video picture may be formed by combining left view video components and right view video components. Each picture of the captured uncompressed 3D video is in a fixed size (in bits). In this regard, each picture of the captured uncompressed 3D video may be quantized to a target bit-rate. The quantized pictures may be communicated with corresponding video encoders such as the base view encoder 212 and the enhancement view encoder 214 for video compressing, for example, using MPEG-4 MVC standard.

The base view encoder 214 may comprise suitable logic, circuitry, interfaces and/or code that may be operable to encode the left view video, for example, from the 3D video source 210 picture-by-picture. The base view encoder 214 may be operable to utilize various video compression algorithms such as specified in MPEG-4, AVC, VC1, VP6, and/or other video formats to form compressed or coded video contents for the left view video from the 3D video source 210.

Information such as the scene information from base view coding may be communicated with the enhancement view encoder 216 to be used for enhancement view coding by the enhancement view encoder 216. The base view encoder 214 may also be operable to receive information, comprising for example scene change information from the enhancement view encoder 216.

The enhancement view encoder 216 may comprise suitable logic, circuitry, interfaces and/or code that may be operable to encode the right view video, for example, from the 3D video source 210 picture-by-picture. The enhancement view encoder 216 may be operable to utilize various video compression algorithms such as specified in MPEG-4, AVC, VC1, VP6, and/or other video formats to form compressed or coded video content for the right view video from the 3D video source 210. The enhancement view coding may be correlated to the base view coding using the scene information from the base view coding. Information such as the scene information from enhancement view coding may be communicated to the base view encoder 214 to be used for base view coding by the base view encoder 214. The enhancement view encoder 216 may also be operable to receive information comprising for example, scene change information from the base view encoder 214.

The FIFO buffers 214-216 may comprise suitable logic, circuitry, interfaces and/or code that may be operable to buffer or store compressed pictures from the base view encoder 214 and the enhancement view encoder 216, respectively. The FIFO buffers 214-216 may operate in a first-in-first-out basis. The FIFO buffers 214-216 may be operable to manage the buffered compressed pictures, which may be with corresponding target bit-rate, so as to be transmitted in an intended frame rate based on, for example, QoS of targeted programs.

The multiplexer 230 may comprise suitable logic, circuitry, interfaces and/or code that may be operable to merge compressed video streams from the base view encoder 214 and the enhancement view encoder 216 into a single video stream, namely a transport stream (TS), for transmission.

The host processor 230 may comprise suitable logic, circuitry, interfaces and/or code that may be operable to control and manage associated components such as, for example, the rate-control processor 240, the base view encoder 214 and the enhancement view encoder 216. The host processor 230 may be operable to set up a target bit rate for video compression to be maintained by the rate-control processor 240.

The rate-control processor 240 may comprise suitable logic, circuitry, interfaces and/or code that may be operable to allocate bits to each picture in video compression for the base view encoder 214 and the enhancement view encoder 216, respectively. The rate-control processor 240 may be operable to allocate bits to each picture with a specific bit-rate according to corresponding picture information. The rate-control processor 240 may be operable to control and/or maintain the rate-control based on picture type like I-picture, P-picture and B-picture, and associated coding view and/or coding layer information. For example, for pictures in a specific coding view of a coding layer, the rate control processor 240 may be operable to allocate most bits to an I-picture, more bits to a P-picture than a B-picture. A picture such as a P-picture in the base view may be allocated more bits than a same type picture, a P-picture, in the enhancement view. A picture in a lower coding layer may be allocated more bits than a same type picture in a higher coding layer. Since the base view video and the enhancement view video are the two video streams of the same program, the correlation level of the base view video and the enhancement view video may be utilized for rate-control in video compression. For example, the rate control processor 240 may be operable to allocate bits to pictures in the base view video and in the enhancement view video, respectively, based on the corresponding correlation level between the base view video and the enhancement view video.

Rate-control may be executed concurrently for pictures in both the base view video and the enhancement view video. In video compression, within a GOP, subsequent pictures may be coded based on previous adjacent pictures. In this regard, the rate-control for pictures with the same coding order may be processed jointly. The rate control processor 240 may be operable to monitor the status of the FIFO buffers 214-216 and/or the multiplexer 220 such that the rate-control may be managed or maintained to support a specific transmission rate at the multiplexer 220 without overflow and/or underflow in the FIFO buffers 214-216.

In an exemplary operation, the 3D video source 210 may be operable to capture an uncompressed 3D video, which comprises a left view video and a right view video. The host processor 230 may be operable to set up a corresponding target bit rate for the base view encoder 214 and the enhancement view encoder 216, respectively. The rate-control processor 240 may be operable to control and maintain the rate-control in video compression with respect to the target bit-rate set by the host processor 230. The rate-control processor 240 may be operable to allocate bits to pictures in different coding views and coding layers based on picture type and associated coding view and coding layer information. The correlation level between the base view and the enhancement view video may be used for rate-control in video compression. Pictures in the base view video and the enhancement view video may be quantized according to the corresponding number of allocated bits. The resulting quantized pictures in the base view video and in the enhancement view video may be compressed or coded via the base view encoder 212 and the enhancement view encoder 214, respectively. The resulting compressed pictures in the base view video and the enhancement view video may be stored in the FIFO buffer 216 and 218, respectively, for transmission. The multiplexer 220 may be operable to multiplex video streams from the FIFO buffer 216 and the FIFO buffer 218 into a single transport stream to be transmitted to the VRU 130 via the communication network 120.

Figure 3:
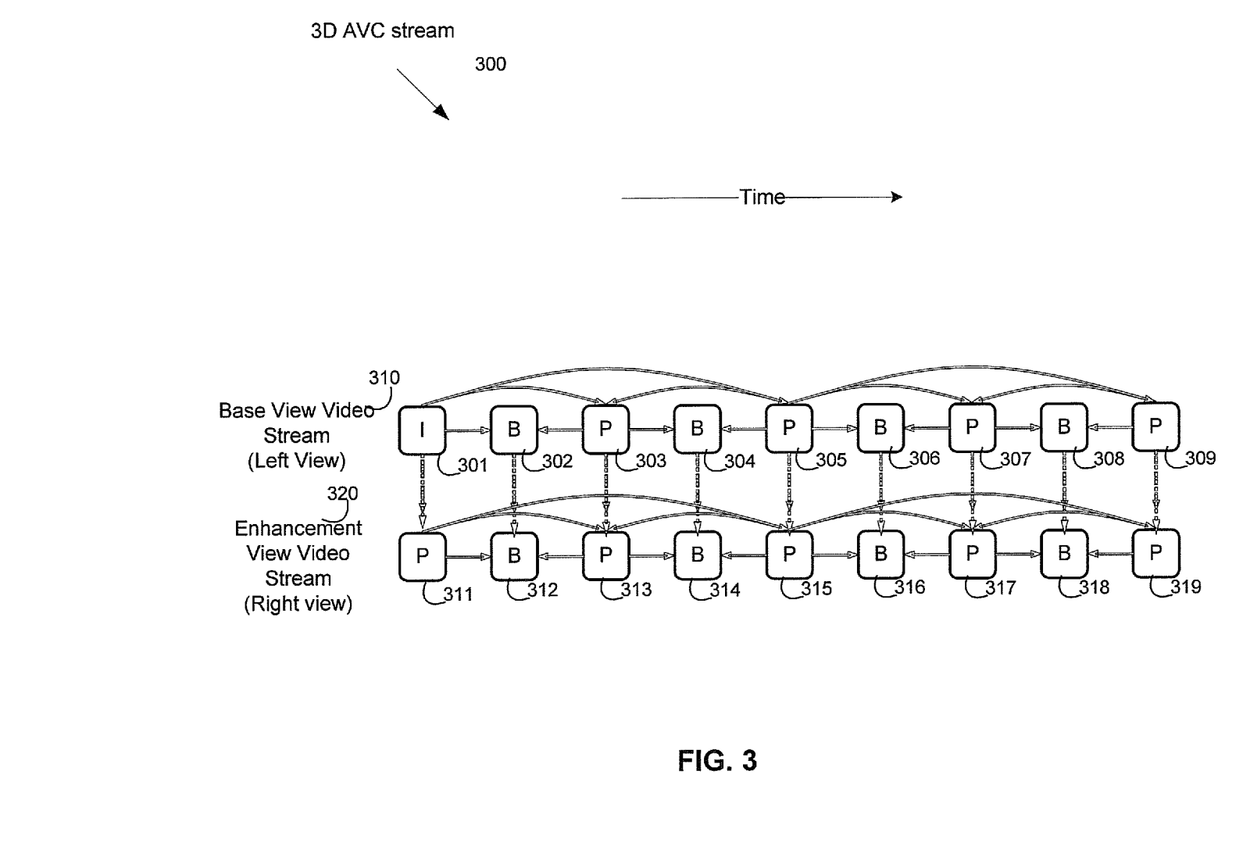
FIG. 3 is a diagram illustrating an exemplary independently decodable 3D AVC stream that is produced via asymmetrical rate control based on picture type, in accordance with an embodiment of the invention.

FIG. 3 is a diagram illustrating an exemplary independently decodable 3D AVC stream that is produced via asymmetrical rate control based on picture type, in accordance with an embodiment of the invention. Referring to FIG. 3, there is shown a 3D AVC stream 300. The 3D AVC stream 300 comprises a base view video stream 310 and an enhancement view video stream 320, which are generated or produced by the base view encoder 212 and the enhancement view encoder 214, respectively, using, for example, MPEG-4 MVC standard. The base view video stream 310 comprises a plurality of pictures, of which, an I-picture 301, P-pictures 303, 305, 307 and 309, and B-pictures 302, 304, 306 and 308 are illustrated. The enhancement view video stream 320 comprises a plurality of pictures, of which, P-pictures 311, 313, 315, 317 and 319, and B-pictures 312, 314, 416 and 318 are illustrated. The bit-rate for each picture in the base view video stream 310 and the enhancement view video stream 320 may be controlled and maintained by the rate-control processor 240. A bit-rate of a picture in the 3D AVC stream 300 may be determined based on a picture type such as I-picture, P-picture and B-picture. For example, for a given coding view such as the base view video stream 310, most bits available for the base view video stream 310 may be allocated to I-pictures such as the I-picture 301, and more bits may be allocated to P-pictures than B-pictures in the enhancement view video stream 310.

For a given amount of distortion, the base view video stream 310 and the right view video stream 320 may have different impacts on perceptual visual quality of the 3D AVC stream 300. Accordingly, a picture in the base view video stream 310 may be allocated more bits than the same type picture in the enhancement view video stream 320. For example, more bits may be allocated to the B-picture 302 in the base view video stream 310 than to the B-picture 312 in the enhancement view video stream 320.

Figure 4:
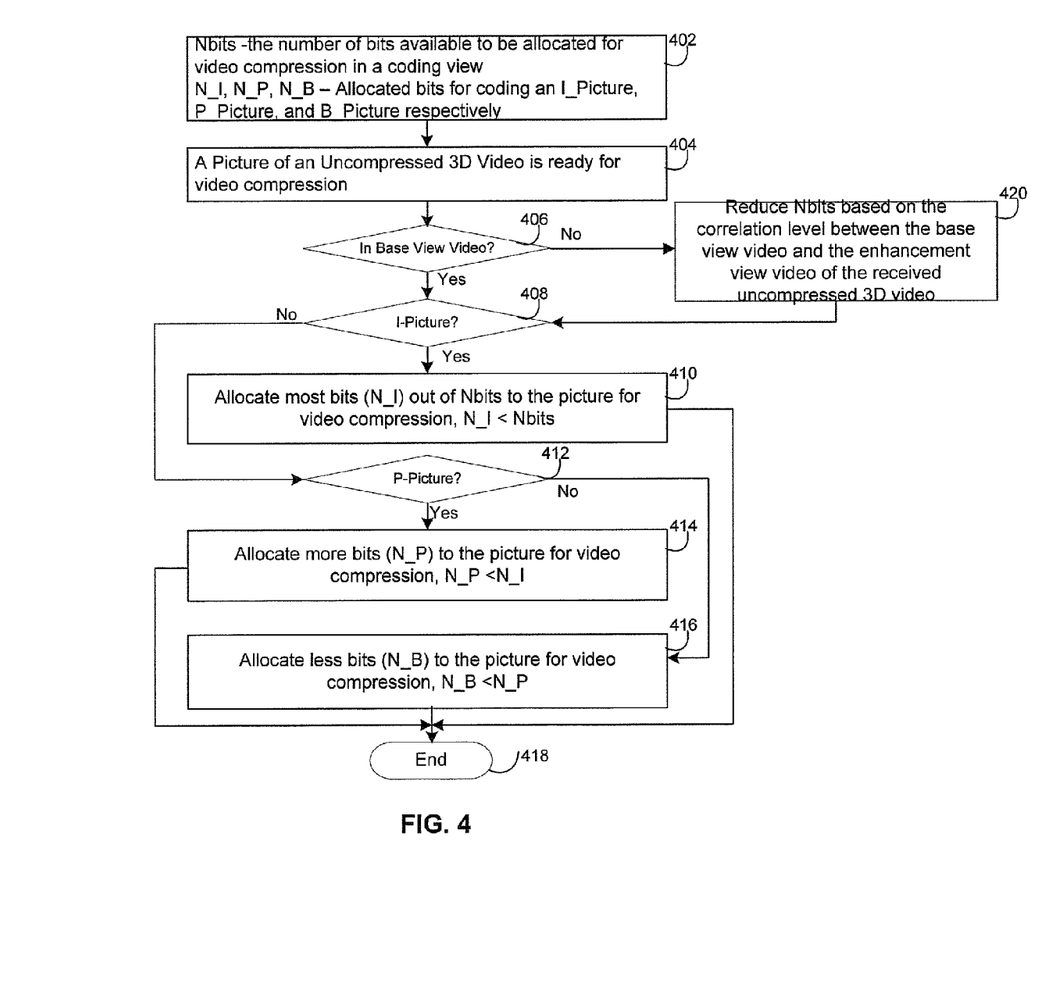
FIG. 4 is a flow chart illustrating exemplary steps that are utilized to allocate bits based on picture type to produce an independently decodable 3D AVC stream, in accordance with an embodiment of the invention.

FIG. 4 is a flow chart illustrating exemplary steps that are utilized to allocate bits based on picture type to produce an independently decodable 3D AVC stream, in accordance with an embodiment of the invention. Referring to FIG. 4, the exemplary steps start with step 402, where parameter $N_{bits}$ indicates the number of bits available for video compression in a coding view. Parameters N_I, N_P, and N_B indicate number of bits available to be allocated to an I-picture, a P-picture and a B-picture, respectively, in the coding view for video compression. In step 404, the 3D video source 210 may be operable to capture an uncompressed 3D video and provide a picture of the captured uncompressed 3D video for video compression. In step 406, it may be determined whether the picture for video compression may be in the base view video of the captured uncompressed 3D video. In instances where the picture for video compression is in the base view video of the captured uncompressed 3D video, then in step 408, it may be determined whether the picture for video compression is an I-picture in video compression. In instances where the picture for video compression is an I-picture in video compression, then in step 410, the picture may be allocated most bits (N_I) out of the total bits available for the view. The exemplary steps may be ended in step 418.

In step 408, in instances where the picture for video compression is not an I-picture, then in step 412, it may be determined whether the picture for video compression is a P-picture. In instances where the picture for video compression is a P-picture, then in step 414, the picture may be allocated more bits (N_P) out of the total bits available for the view and N_P<N_I. The exemplary steps may end at step 418.

In step 412, in instances where the picture for video compression is not a P-picture, then in step 416, where the picture may be allocated less bits (N_B) out of the total bits available for the view and N_B<N_P. The exemplary steps may end at step 418.

In step 406, in instances where the picture for video compression is not in the base view video of the captured uncompressed 3D video, then in step 420, where the number of bits available for the view, Nbits, may be reduced based on the correlation level between the base view video and the enhancement view video of the received uncompressed 3D video. The exemplary steps continue in step 408.

Figure 5:
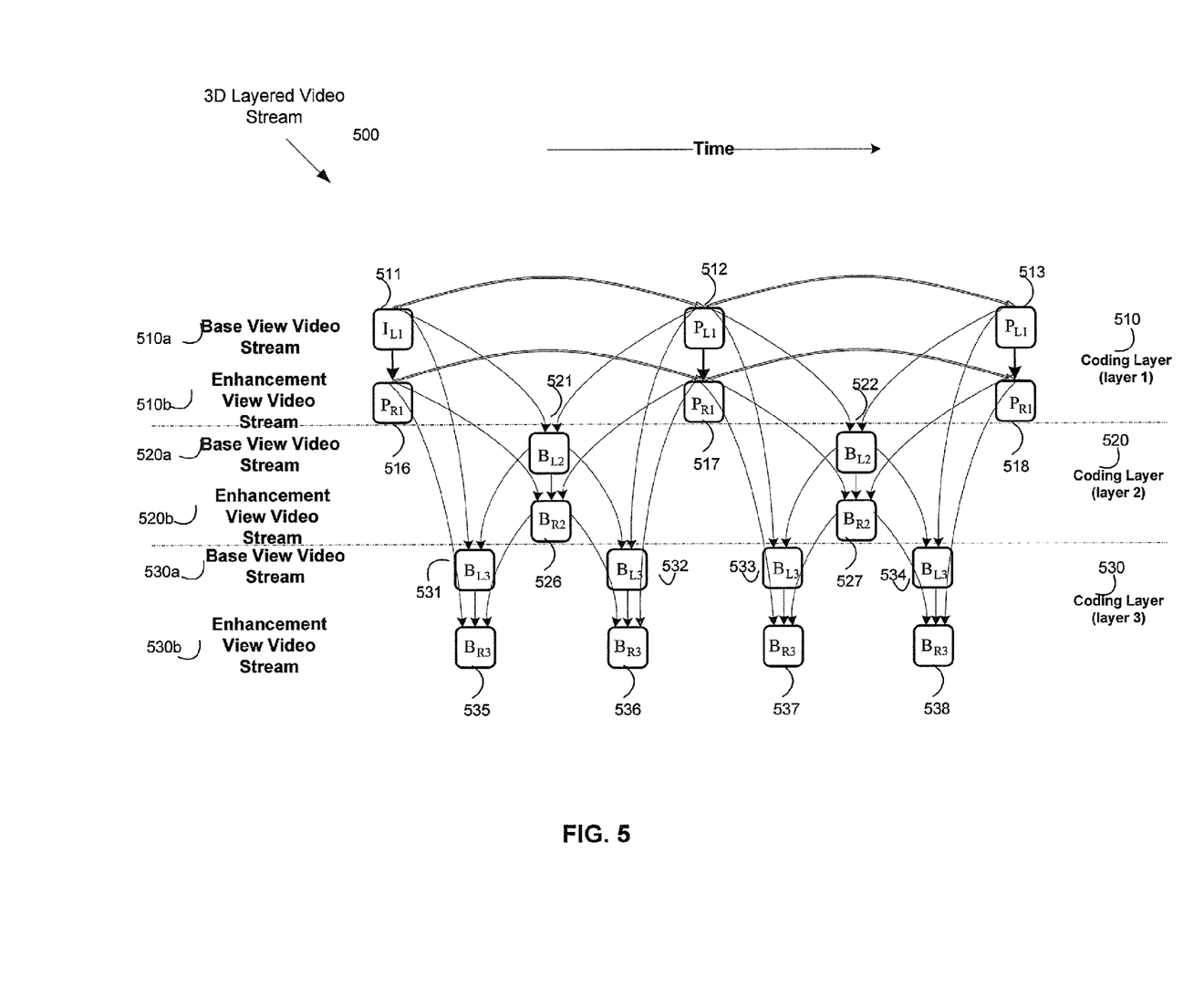
FIG. 5 is a diagram illustrating an exemplary 3D layered compressed stream that is produced via asymmetrical rate control based on picture type, in accordance with an embodiment of the invention.

FIG. 5 is a diagram illustrating an exemplary 3D layered compressed stream that is produced via asymmetrical rate control based on picture type, in accordance with an embodiment of the invention. Referring to FIG. 5, there is shown a 3D layered stream 500. The 3D layered stream 500 comprises coding layers 510-530, which correspond to the base layer (layer 1), the middle layer (layer 2) and the high layer (layer 3), respectively, of the 3D layered stream 500. Two coding views are generated or produced in each coding layer using MPEG-4 MVC standard, for example. A base view video stream 510a and an enhancement view video stream 510b are generated in the coding layer 510. Each video stream in the coding layer 510 may comprise a plurality of pictures, of which pictures 511-518, 521-527, and 531-538 are illustrated. For a given view, pictures in a higher coding layer may be coded based on adjacent pictures in lower coding layers. For example, in the enhancement view, the picture 536 in the coding layer 530 (layer 3) may be coded based on the picture 516 in the coding layer 510 (layer 1) and the picture 526 in the coding layer 520 (layer 2). As presented with respect to FIG. 5, the coding layer 510 (layer 1) may be the starting coding layer in the 3D layered stream 500, other coding layers such as the coding layer 520 (layer 2) and the coding layer 530 (layer 3) may be coded depending on the coding layer 510 (layer 1). Accordingly, different importance of coding layers may exist in the 3D layered stream 500. The coding layer 510 (layer 1) may be most important, and the coding layer 520 (layer 2) may be more important than the coding layer 530 (layer 3). In this regard, the number of bits, which may be allocated to each picture in the 3D layered stream 500, may be determined according to a descending order of importance from the coding layer 510 (layer 1) to the coding layer (layer 3). For a given coding view such as a base view video, more bits may be allocated to a picture in a lower coding layer than to the same type picture in a higher coding layer. For example, more bits may be allocated to the B-picture 521 in the coding layer 520 than the pictures such as the B-pictures 531-532 in the coding layer 530.

Figure 6:
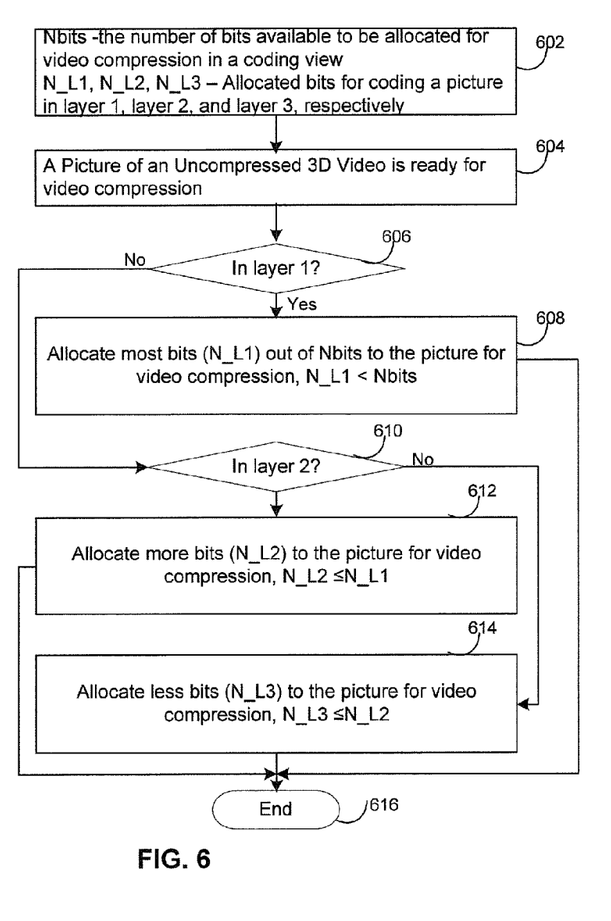
FIG. 6 is a flow chart illustrating exemplary steps that are utilized to allocate bits based on picture type to produce a 3D layered compressed stream, in accordance with an embodiment of the invention.

FIG. 6 is a flow chart illustrating exemplary steps that are utilized to allocate bits based on picture type to produce a 3D layered compressed stream, in accordance with an embodiment of the invention. Referring to FIG. 6, the exemplary steps start with step 602, where parameter $N_{bits}$ indicates the number of bits available to be allocated pictures in a coding view for video compression. Parameters N_L1, N_L2, and N_L2 indicate number of bits available to be allocated to pictures in layer 1, layer 2 and layer 3, respectively, for video compression. In step 604, the 3D video source 210 may be operable to capture an uncompressed 3D video and provide a picture of the captured uncompressed 3D video for video compression. In step 606, it may be determined whether the picture may be in the layer 1 for video compression. In instances where the picture may be in the layer 1 for video compression, then in step 608, the picture may be allocated most bits (N_L1) out of the total bits available for the coding view. The exemplary steps may end at step 616.

In step 606, in instances where the picture may not be in the layer 1 for video compression, then in step 610, it may be determined whether the picture may be in the layer 2 for video compression. In instances where the picture may be in the layer 2 for video compression, then in step 612, the picture may be allocated more bits (N_L2) out of the total bits available for the coding view and N_L2<N_L1. The exemplary steps may end at step 616.

In step 610, in instances where the picture for video compression is not in the layer 2 for video compression, then in step 612, then in step 614, the picture may be allocated less bits (N_L3) out of the total bits available for the coding view and N_L3<N_L2. The exemplary steps may end at step 616.

Figure 7:
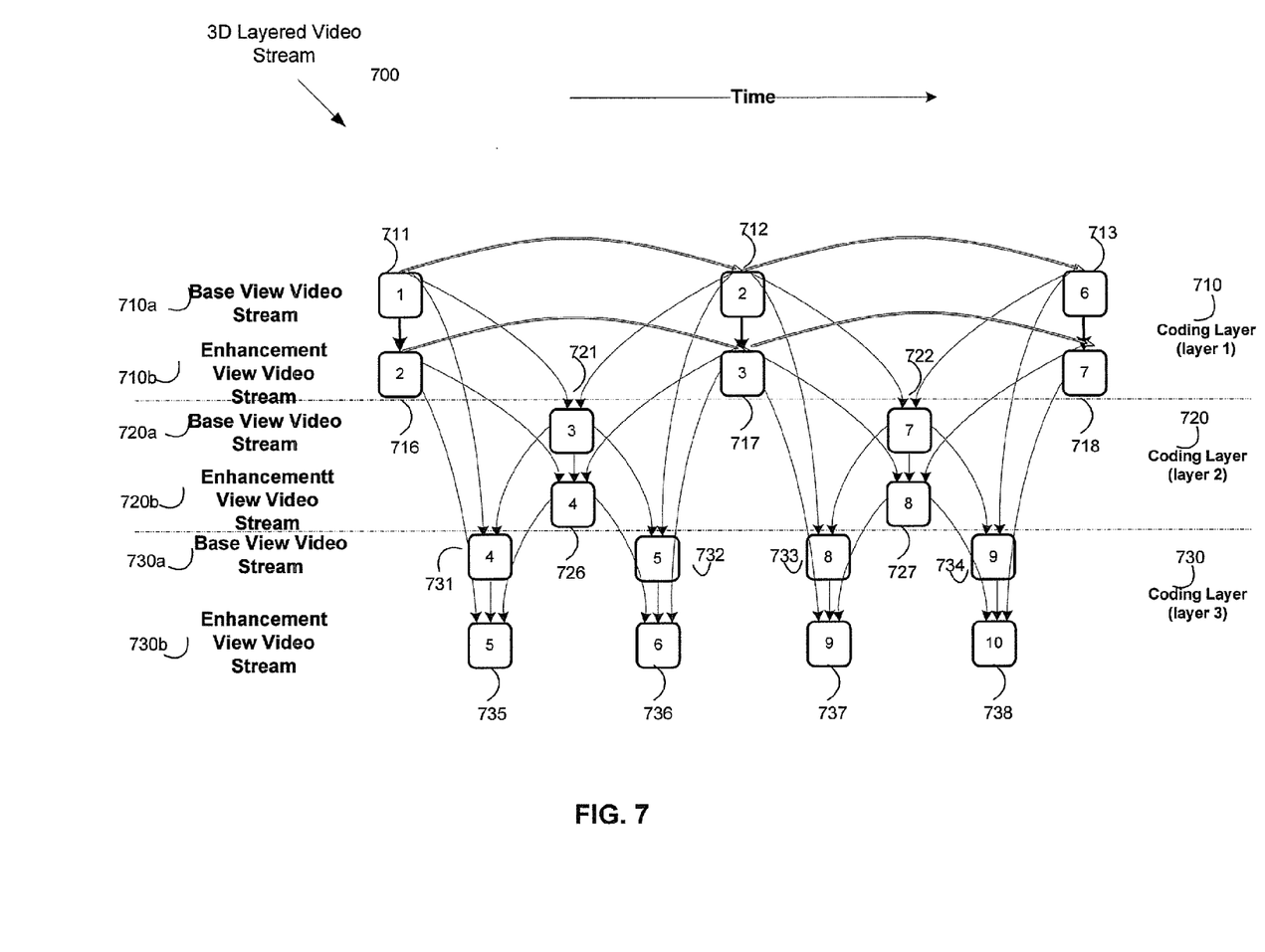
FIG. 7 is a diagram illustrating an exemplary 3D layered compressed stream that is produced via jointly allocating bits to pictures in base and enhancement view videos based on picture type, in accordance with an embodiment of the invention.

FIG. 7 is a diagram illustrating an exemplary 3D layered compressed stream that is produced via jointly allocating bits to pictures in base and enhancement view videos based on picture type, in accordance with an embodiment of the invention. Referring to FIG. 7, there is shown a 3D layered stream 700. The 3D layered stream 700 comprises coding layers 710-730, which correspond to the base layer (layer 1), the middle layer (layer 2) and the high layer (layer 3), respectively, of the 3D layered stream 700. Two coding views are generated in each coding layer using MPEG-4 MVC standard. For example, a base view video stream 710a and an enhancement view video stream 710b are generated in the coding layer 710. Each view stream comprises a plurality of pictures, of which pictures 711-718, 721-727, and 731-738 in a GOP are illustrated. For example, the base view video stream 710a comprises an I-picture 711, P-pictures 712 and 713. Pictures in the GOP may be coded based on the previous adjacent pictures in the same coding view. For example, in a coding view, the picture 722 and the picture 733 are adjacent pictures subsequent to the picture 712 in the coding layer 720 and the coding layer 730, respectively. Each of the picture 722 and the picture 733 may be coded based on the picture 712. Pictures in the GOP are labeled according to corresponding coding order. For example, in instances where the picture 711 may be the start picture of the GOP, the picture 711 may be coded first and the picture 712 may be coded second, and so on. The corresponding coding order number for the picture 711 and the picture 712 are 1 and 2, respectively. In this regard, the rate-control for video compression may be performed on pictures according to corresponding coding order numbers. Rate-control may be processed simultaneously for pictures with the same coding order number. For example, the picture 717 and the picture 722 are with the same coding order number of 7, a joint rate-control may be performed on the picture 717 and the picture 722 simultaneously.

Figure 8:
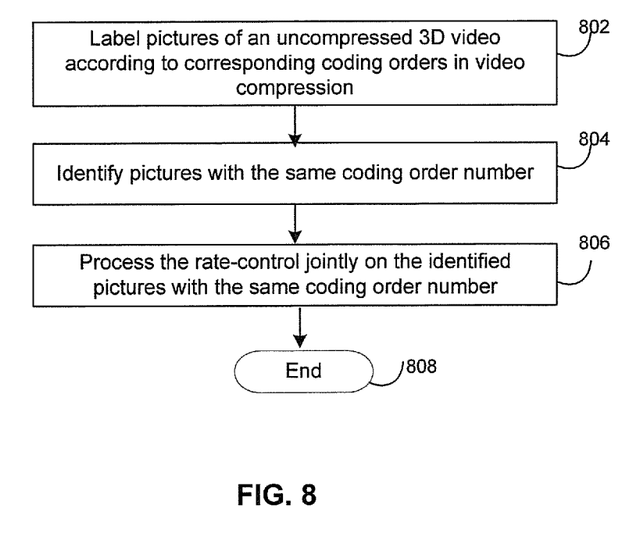
FIG. 8 is a flow chart illustrating exemplary steps that are utilized to perform a joint rate-control for a 3D layered compressed stream, in accordance with an embodiment of the invention.

FIG. 8 is a flow chart illustrating exemplary steps that are utilized to perform a joint rate-control for a 3D layered compressed stream, in accordance with an embodiment of the invention. Referring to FIG. 8, the exemplary steps start with step 802, where pictures of an uncompressed 3D video may be labeled according to corresponding coding orders in video compression. In step 804, pictures with the same coding order number may be identified. In step 806, the rate-control may be performed or processed jointly on the identified pictures with the same coding order number. The exemplary steps may end at step 808.

Aspects of a method and system for asymmetrical rate control for 3D video are provided. In accordance with various embodiments of the invention, a video transmitter such as the VTU 200 may be operable to receive an uncompressed three-dimensional (3D) video via the 3D video source 210. The received uncompressed 3D video comprises a left view video and a right view video. The VTU 200 may be operable to compress the received 3D video using MPEG-4 MVC standard to generate two coding views (a base view and an enhancement view) and layered compressed pictures for transmission. In this regard, the VTU 200 may be operable to allocate bits to each resulting compressed picture of the received uncompressed 3D video based on corresponding picture type such like I-picture, P-picture and B-picture. As described with respect to, for example, FIG. 2-FIG. 5, in a given coding layer such as the coding layer 510, most bits available for each view video such as the base view video stream 310, for example, may be allocated to I-pictures such as the I-picture 301, and more bits may be allocated to P-pictures than B-pictures in the base view video stream 310. For example, in the base view video stream 310, N_I bits may be allocated to an I-picture, N_P bits to a P-picture, and N_B bits to a B-picture, respectively, where N_I, N_P, and N_B are positive integers and N_I>N_P>N_B. More bits may be allocated to a compressed picture of the base view video 310 than a same type compressed picture of the enhancement view video 320. For example, N_base bits may be allocated to the B-picture 302 in the base view video stream 310 and N_enhancement bits may be allocated to the B-picture 312 in the enhancement view video stream 320, where N_base and N_enhancement are positive integers, and N_base>N_enhancement. In the acquired uncompressed 3D video, the associated base and enhancement view videos are the two video streams of the same program, the correlation level between the base view video and the enhancement view video may be utilized for bit-allocation in video compression. For example, the rate control processor 240 may be operable to allocate bits to compressed pictures of the base view video and the enhancement view video, respectively, based on the corresponding correlation level between the base view video and the enhancement view video.

In a 3D layered video stream such as the 3D layered video stream 500, compressed pictures in a high coding layer such as the coding layer 530 may be derived from compressed pictures in low coding layers. For a given coding view, more bits may be allocated to a picture in a lower coding layer than to the same type picture in a higher coding layer. For example, N_low_layer bits may be allocated to the B-picture 521 in the coding layer 520 and N_high_layer bits may be allocated to the pictures such as the B-pictures 531-532 in the coding layer 530, N_low_layer and N_high_layer are positive integers, and N_low_layer>N_high_layer. For a specific 3D program, the host processor 230 may be operable to determine or set up target bit-rates for the associated base view and enhancement view videos, respectively, for video compression. The host processor 230 may be operable to control and manage, for example, the rate-control processor 240, the base view encoder 212 and the enhancement view encoder 214 such that the base view video and the enhancement view video may be processed concurrently based on the corresponding determined target bit-rates. Coding orders may be determined according to the determined target bit-rates. As described with respect to FIG. 2, FIG. 7 and FIG. 8, the VTU 200 may be operable to perform compression coding on pictures according to the determined coding order. Pictures with the same cording order may be identified for a parallel video compression coding. For example, the picture 717 and the picture 722 are with the same coding order number of 7, a joint bit-allocation may be performed to the picture 717 and the picture 722 in video compression. The identified compressed pictures with same coding order may be in different view videos.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a method and system for asymmetrical rate control for 3D video.

Accordingly, the present invention may be realized in hardware, software, or a combination thereof. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein. The present invention may be realized in hardware that comprises a portion of an integrated circuit that also performs other functions.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for video processing, the method comprising:
performing by one or more processors and/or circuits in a video processing system:
compressing an uncompressed three-dimensional (3D) video having a first view video and a second view video into a base view video and an enhancement view video, wherein the first view video is compressed into the base view video and the second view video is compressed into the enhancement view video and wherein said compressing comprises:
allocating a first number of bits to a compressed picture of the base view video with a first picture type; and
allocating a second number of bits to a compressed picture of the enhancement view video with the first picture type.

2. The method according to claim 1, comprising for a given coding layer, allocating N_I bits to an I-picture, N_P bits to a P-picture, and N_B bits to a B-picture of said base view video and/or said enhancement view video, wherein $N_{13}I$, N_P, and N_B are positive integers and $N_{13}$ I>N_P >N_B.

3. The method according to claim 2, comprising for said given coding layer, allocating N_base bits to a compressed picture of said base view video and N_enhancement bits to a compressed picture of said enhancement view video, wherein said compressed picture of said base view video is of same picture type as said compressed picture of said enhancement view video same type, wherein N_base and N_enhancement are positive integers, and N_base >N enhancement.

4. The method according to claim 2, comprising for said given coding layer, allocating bits to each compressed picture of said base view video and/or said enhancement view video based on a correlation level between said base view video and said enhancement view video.

5. The method according to claim 1, comprising for a given view video, allocating N_low_layer bits to a compressed picture in a low coding layer and N_high_layer bits to a compressed picture in a high coding layer, wherein said compressed picture in said low coding layer is of same picture type as said compressed picture in said high coding layer, wherein N_low_layer and N_high_layer are positive integers, and N_low_layer >N_high_layer.

6. The method according to claim 1, comprising determining target bit-rates for said base view video and said enhancement view video, respectively.

7. The method according to claim 6, comprising determining coding orders of pictures for said base view video and said enhancement view video according to said determined target bit-rates.

8. The method according to claim 7, comprising identifying compressed pictures with same coding order according to said determination.

9. The method according to claim 8, comprising jointly allocating bits to said identified compressed pictures.

10. The method according to claim 8, wherein said identified compressed pictures with same coding order are in different view videos.

11. A system for video processing, the system comprising:
one or more processors and/or circuits for use in a video processing system, wherein said one or more processors and/or circuits are operable to compress an uncompressed three-dimensional (3D) video into a base view video and an enhancement view video, wherein said compressing comprises allocating bits between a first compressed picture in the base view video and a second compressed picture in the enhancement view video based on corresponding picture type, coding layer and correlation level between the first compressed picture in the base view video and the second compressed picture in the enhancement view video.

12. The system according to claim 11, wherein said one or more processors and/or circuits are operable to, for a given coding layer, allocate N_I bits to an I-picture, N_P bits to a P-picture, and N_B bits to a B-picture of said base view video and/or said enhancement view video, wherein N_I, N_P, and N_B are positive integers and N_I>N_P>N_B.

13. The system according to claim 12, wherein said one or more processors and/or circuits are operable to, for said given coding layer, allocate N_base bits to a compressed picture of said base view video and N_enhancement bits to a compressed picture of said enhancement view video, wherein said compressed picture of said base view video is of same picture type as said compressed picture of said enhancement view video same type, wherein N_base and N_enhancement are positive integers, and N_base >N_enhancement.

14. The system according to claim 12, wherein said one or more processors and/or circuits are operable to, for said given coding layer, allocate bits to each compressed picture of said base view video and/or said enhancement view video based on a correlation level between said base view video and said enhancement view video.

15. The system according to claim 11, wherein said one or more processors and/or circuits are operable to, for a given view video, allocate N_low_layer bits to a compressed picture in a low coding layer and N_high_layer bits to a compressed picture in a high coding layer, wherein said compressed picture in said low coding layer is of same picture type as said compressed picture in said high coding layer, wherein N_low_layer and N_high_layer are positive integers, and N_low_layer >N_high_layer.

16. The system according to claim 11, wherein said one or more processors and/or circuits are operable to determine target bit-rates for said base view video and said enhancement view video, respectively.

17. The system according to claim 16, wherein said one or more processors and/or circuits are operable to determine coding orders of pictures for said base view video and said enhancement view video according to said determined target bit-rates.

18. The system according to claim 17, wherein said one or more processors and/or circuits are operable to identify compressed pictures with same coding order according to said determination.

19. The system according to claim 18, wherein said one or more processors and/or circuits are operable to jointly allocate bits to said identified compressed pictures.

20. The system according to claim 18, wherein said identified compressed pictures with same coding order are in different view videos.

\* \* \* \* \*